United States Patent
Behn et al.

[11] 3,900,788
[45] Aug. 19, 1975

[54] VOLTAGE MULTIPLIER

[75] Inventors: Reinhard Behn; Gerhard Hoyler, both of Munich, Germany

[73] Assignee: Siemens Aktiengesellschaft, Berlin & Munich, Germany

[22] Filed: Mar. 21, 1974

[21] Appl. No.: 453,426

[30] Foreign Application Priority Data
Mar. 23, 1973 Germany............................ 2314674

[52] U.S. Cl................. 321/15; 317/256; 317/261
[51] Int. Cl......................... H01g 3/07; H02m 7/24
[58] Field of Search ....... 321/8 R, 15; 317/256, 261

[56] References Cited
UNITED STATES PATENTS

| 3,398,326 | 8/1968 | Swart et al. .......................... 317/256 |
| 3,589,003 | 6/1971 | Kastner .................................. 321/15 |
| 3,593,107 | 7/1971 | Chilton et al. ...................... 321/8 R |
| 3,646,424 | 2/1972 | Dangschat ............................ 321/15 |
| 3,714,530 | 1/1973 | Wells et al. ........................... 321/15 |
| 3,849,791 | 11/1974 | Nakashima ........................... 321/15 |

FOREIGN PATENTS OR APPLICATIONS
1,222,161   2/1971   United Kingdom................... 321/15

*Primary Examiner*—William H. Beha, Jr.
*Attorney, Agent, or Firm*—Hill, Gross, Simpson, Van Santen, Steadman, Chiara & Simpson

[57] ABSTRACT

A voltage multiplier formed by a pair of end contacted layer capacitors. The layer capacitors may be arranged side by side or may be stacked one upon the other. In each case a series of slits are cut in the capacitor to divide the unit into a plurality of individual capacitors, each being integrally connected by an unslit web. The diodes which are part of the voltage multiplier are then arranged in substantially parallel relation to extend across the capacitor body to make electrical contact between the end faces thereof.

12 Claims, 5 Drawing Figures

VOLTAGE MULTIPLIER

BACKGROUND OF THE INVENTION

1. Description of the Prior Art

Voltage multipliers of the type involved in the present invention are normally used in color television receivers to produce the high voltage for the picture tube anode. The known electrical voltage multipliers of this type are normally manually assembled from individual components and are soldered together. Such an arrangement is time consuming and it is not always possible to automate the soldering process in such a method of construction.

2. Field of the Invention

The field of art to which this invention pertains is solid state voltage multipliers and in particular to such voltage multipliers which are formed of an integral arrangement of layer type capacitors end contacted by the Schoop process.

SUMMARY OF THE INVENTION

It is an important feature of the present invention to provide an improved structure for a voltage multiplier.

It is another feature of the present invention to provide a voltage multiplier using a layer type capacitor arrangement.

It is a principle object of the present invention to provide an improved solid state voltage multiplier which is subject to easy production techniques.

It is another object of the present invention to provide a voltage multiplier formed of a layer type capacitor which is manufactured in such a way as to permit a series of diodes used in the multiplier to be readily easily soldered to the capacitor terminals in a single plane.

It is an additional object of the present invention to provide a voltage multiplier as described above wherein the capacitors of the multiplier consist of two layer type capacitors, each being slit in such a way as to form two sets of series connected individual capacitors.

It is also an object of this invention to provide a voltage multiplier as described above wherein the two sets of individual capacitors are arranged in side by side spaced relation.

It is a further object of the present invention to provide a voltage multiplier as described above wherein the two sets of serially connected individual capacitors are stacked one upon the other, and the diodes used in the multiplier are caused to span the body of the capacitor assembly and make electrical contact between the end faces thereof.

These and other features, advantages and objects of the present invention will be understood in greater detail from the following description and the associated drawings wherein reference numerals are utilized as to designate the preferred embodiments.

DESCRIPTION OF THE PREFERRED EMBODIMENTS

The present invention relates to an electric voltage multiplier of the type used in television receivers to produce the high anode voltage for the picture tube. Such multipliers usually consist of two rows of serially connected capacitors with a plurality of diodes connecting the capacitor terminals on one row with the like terminals on the other row. The diodes are connected in series to pass a unidirectional pulse and are arranged in such a way as to charge each of the capacitors.

By virtue of the present invention, there is provided a smaller physical design for a voltage multiplier and a physical construction which is easily suited to automation processes.

This is accomplished in the present invention by providing the two rows of serially connected capacitors to be formed from end contacted layer capacitors which are integrally joined together. The metal coatings of each layer of the capacitors have free edges at opposite sides, and the capacitor layers are split by a series of slits which form individual capacitors connected electrically in series. The slits pass from one end face to a point just beyond the capacitor zone of the capacitor. In each case the individual capacitors are connected in series with the other capacitors by an inner coating which is not severed in making the slits.

Capacitor networks of the type described are known from the German text laid open to public inspection No. 1,764,861. It is not possible however to achieve a simple production technique for voltage multipliers by the use of the teachings of this patent. Only by means of the combination of features of the present invention such as using an inner series connection has it been possible to develop an arrangement where all contact surfaces lie on the same end face of the capacitor network. In this way it has been possible to achieve a physical construction which enables the taking advantage of the most automated production techniques. Furthermore the use of capacitor networks which are based upon the principle of layer capacitors provides the added advantage that it is possible to use silicon diodes which are considerably smaller than the selenium rectifiers heretofore used.

In one arrangement of the invention, the two capacitor networks are arranged next to one another and the diodes are arranged substantially parallel to one another except for one of the diodes at the end of the circuit. This enhances the possibility of using automating processes. For the same reason, it is advisable for the contact surfaces to lie in a single plane which is possible according to the present invention.

Figure 5:
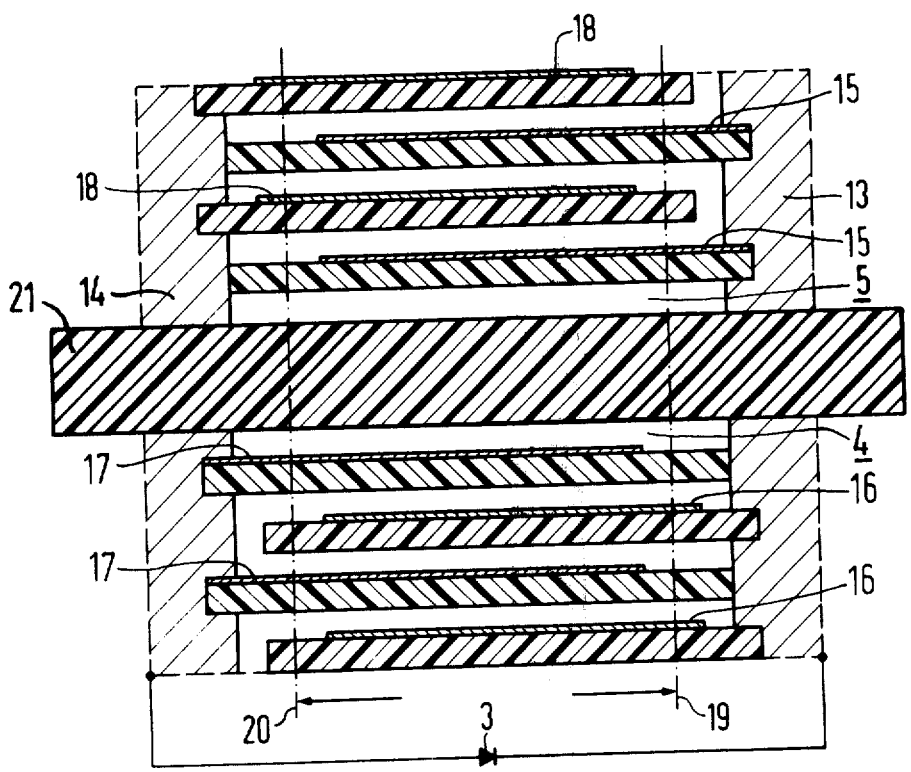
FIG. 5 shows two capacitor networks which are separated by an insulating layer which extends beyond the Schoop layers.

A particularly space saving embodiment of the invention is provided in which the two capacitor networks are arranged one above another in a stacked manner and are separated from one another by an insulating intermediate layer which may extend beyond the Schoop layer as shown in FIG. 5.

Also, the projecting of the insulating layer and the removal of Schoop metal from the layers can be avoided if the two capacitor networks are stacked in such a way and separated by an insulating layer which does not project beyond the Schoop layers, if in the region of one end face, all the coatings of one capacitor network has free edge zones exposed. In such an arrangement each of the coatings is displaced in relation to the adjacent coatings. In such a manner the Schoop layer only covers the coatings of one of the two capacitor networks and the coatings of the other network is safely insulated from the Schoop layer by the free edge zones. At the same time, a mechanically stable structure is formed, since the Schoop layer also secures the parts of the end faces which they do not electrically contact.

A construction which is particularly advantageous is one in which the two capacitor networks are congruent and the diodes are arranged on one side of the capacitor network and welded to the Schoop layers. In this case the diodes are arranged perpendicularly to the end contact layers.

A simple process for the production of voltage multipliers according to the present invention is such that the capacitor networks are arranged in side by side spaced relation and the contact surfaces are generally in a single plane. In this arrangement the diodes are arranged in a direction perpendicular to the longitudinal direction of the foils in the capacitor, and the diodes span the end faces of the structure. A diode arranged at the beginning or end of the unit can be positioned at an angle, while the other diodes are arranged in a generally parallel orientation.

The preferred embodiment of the invention which is particularly small designed voltage multipliers consist of stacking the two layer capacitors upon each other and separating them by an insulating layer which does not project over the ends. The slits which are then formed on the capacitor layers, divide the capacitors into individual elements, and the diodes are placed in position on the top of the arrangement in such a way that the terminals of the diodes connect the end faces of the capacitor layers.

Figure 1:
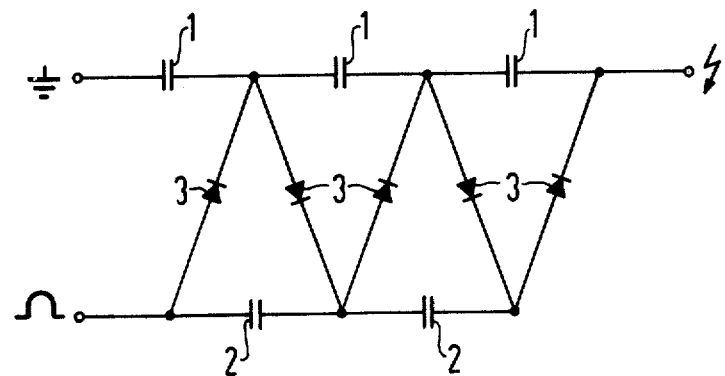
FIG. 1 shows a circuit diagram of a voltage multiplier in accordance with the present invention.
Figure 2:
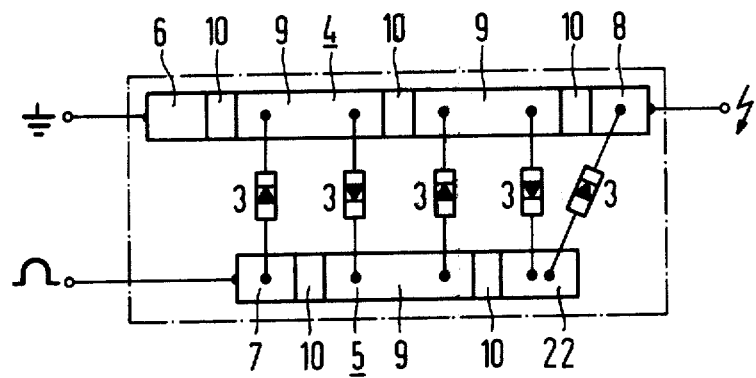
FIG. 2 shows a voltage multiplier in accordance with the present invention wherein two separate capacitor networks are used and arranged in side by side spaced relation.

Referring to the drawings for greater detail FIG. 1 shows a schematic of a voltage multiplier according to the present invention in which capacitors 1 form one serially connected set and capacitors 2 form a second serially connected set. The capacitor network 4 of FIG. 2 is formed from the capacitors 1 of FIG. 1. The capacitor network 5 of FIG. 2 is formed in accordance with the invention from the capacitors 2 of FIG. 1. In FIG. 1 the diodes 3 are connected from the terminals of the capacitors 1 to the terminals of capacitors 2 as shown to produce a series diode arrangement which charges each of the capacitors as is well understood in the art of voltage multipliers.

The contact surface 6 (FIG. 2) is grounded, while the contact surface 7 is connected to the pulse input. Contact surface 8 is the tap for the high voltage output and the contact surface 9 serves to contact the diodes to two of the capacitors of one capacitor network and the contact surface 22 serves to contact the last capacitor of the capacitor network 5 to two of the diodes.

As in FIG. 2, the diodes 3 are placed on the contact surfaces 7, 8, 22, and 9 and are electrically connected thereto by spot welding. Slots 10 are provided and filled with synthetic material in the course of encasing the arrangement so that they possess the requisite dielectric strength. During operation these slots are connected at least temporarily with the full voltage of a capacitor in the case of television, for example, the voltage across one of these slots may be 8.5 K.V.

Figure 3:
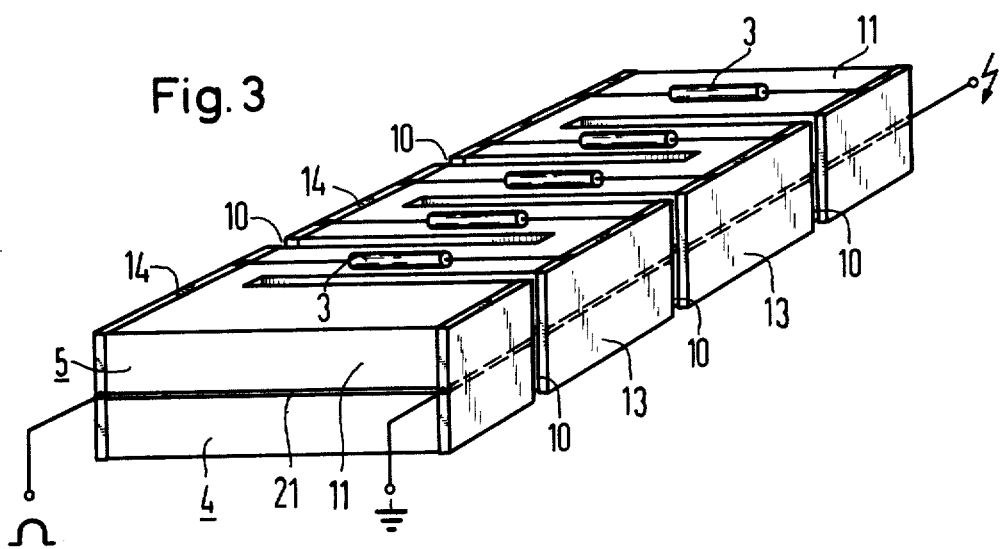
FIG. 3 shows an arrangement having electrical characteristics similar to FIGS. 1 and 2 but wherein the capacitor networks or sets are stacked upon one another in a spaced saving arrangement.

In FIG. 3, an arrangement is shown where the capacitor networks 4 and 5 are congruent and are stacked one above the other. In this case, the outer flanks 11 of the capacitor networks 5 are not used. The two end faces of the capacitor networks 4 and 5 are entirely covered with Schoop layers. The diodes 3 are arranged generally in a parallel layout with respect to the slots 10. The diodes connect the opposite contact surfaces 13 and 14 of the Schoop layers.

Figure 4:
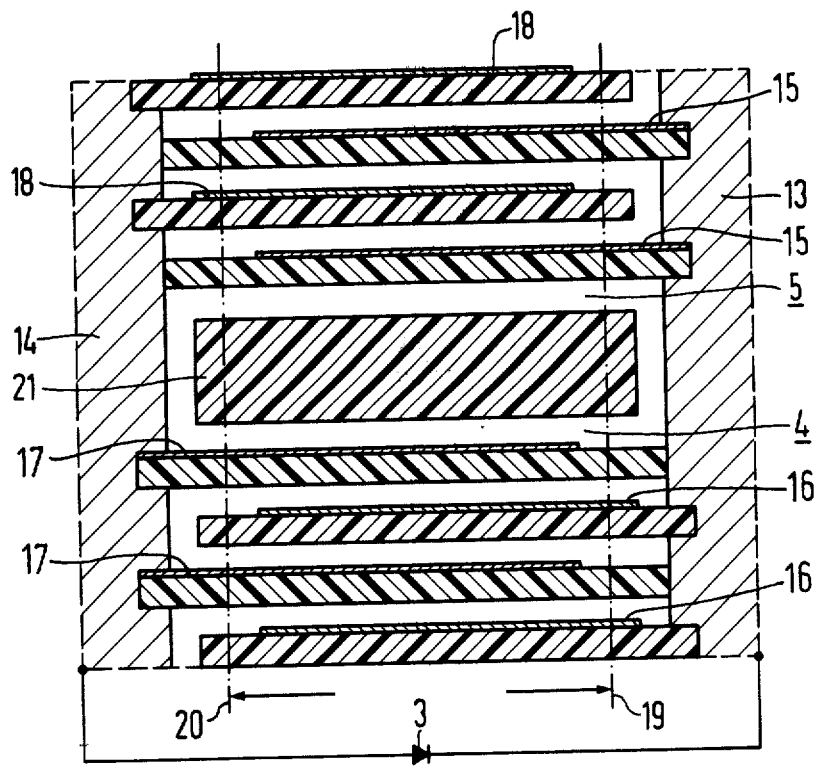
FIG. 4 is a diagrammatic cross sectional view of the arrangement shown in FIG. 3.

As illustrated in FIG. 4, the contact surfaces 13 and 14 contact only the corresponding metal coatings 15 and 17 of one of the capacitor networks 4 and 5. The coating 16 of the capacitor network 4 contacts neither of the two Schoop layers 13 and 14. However, these coatings extend beyond the slot depth 19, so that after the completion of the capacitor network, electrically conductive arms remain outside the slots and are integrally joined to the blind coatings. Accordingly, the blind coatings 18 of the capacitor 5 project beyond the slot depth 20. Thus, it is only possible to contact such a capacitor network on one end side.

The diodes 3 can thus only be connected by welding their two terminals to in each case one contact surface 13 and 14 in accordance with FIG. 1. This construction also must be sealed in order to achieve the required dielectric strength.

The intermediate layer 21 does not project beyond the end faces of the capacitor network 4 and 5 and is covered by the Schoop layer. It prevents sparkovers in the region of the cut edges and breakdowns through the dielectric, since, particularly in the use of a multiple inner series connection, the dielectric does not possess a dielectric strength sufficient to support the voltage of the overall capacitor.

In FIG. 5 the two capacitor networks 4 and 5 are separated from each other by an insulating intermediate layer 21 which extends beyond the Schoop layers 13 and 14. The Schoop layers 13 and 14 are interrupted by this intermediate layer and the upper and lower part of the Schoop layers 13 and 14 can always be contacted and wired separately.

What we claim is:

1. A voltage multiplier having two rows of serially connected capacitors and terminals between capacitors on each row, a diode connecting each capacitor terminal on one row with a capacitor terminal on another row, all of said diodes being connected in series to pass pulses of one polarity only, said diodes being arranged to charge each capacitor, said two rows of serially connected capacitors consisting of end contacted layer capacitors which are integrally joined to one another, said end contacted layer capacitors being split into individual capacitors by slots which extend from one end face of the capacitor through the capacitive zone thereof to a point short of the opposite end face, the individual capacitors having unslotted portions of the metal coatings which serially connect each other, all of the terminals of a row of serially connected capacitors being formed in an end face, whereby said diodes may be readily connected from the terminals on the end face of one row of capacitors to the terminals on the end face of the other row of capacitors.

2. A voltage multiplier in accordance with claim 1 wherein said two rows of capacitors are arranged in side by side relation and spaced from one another, the majority of said diodes being arranged substantially parallel to one another.

3. A voltage multiplier in accordance with claim 1 wherein the terminals of each of the individual capacitors of each capacitor row lie substantially in the same plane.

4. A voltage multiplier in accordance with claim 1 wherein the two rows of capacitors are congruent in physical design, arranged on top of each other as a single integral unit separated by an intermediate insulating layer, the diodes arranged on a single side of the integral capacitor unit and extend perpendicularly to the end contact layers and are welded to the narrow edges of said end contact layer.

5. A voltage multiplier in accordance with claim 4 wherein said end contact layers are formed by the Schoop process.

6. A voltage multiplier in accordance with claim 1 wherein the two capacitor rows are arranged in spaced side by side relation, the end contact surfaces being arranged at the top of each row and lying generally in a single plane, the contact surfaces being arranged in a direction generally perpendicular to the longitudinal direction of the foils forming the capacitors, the majority of said diodes being arranged substantially parallel to one another and having their connection wires welded to the contact surfaces of said capacitor rows.

7. A voltage multiplier in accordance with claim 1 wherein one of said capacitor rows is formed on top of the other, said rows being separated by an insulating intermediate layer which does not project beyond the end contact layers, both rows of capacitors being subject in common to the Schoop process, the diodes spanning the end contact layers and being welded to the narrow edges thereof, the diodes extending in a direction generally parallel to the direction of the foils forming the capacitors.

8. A voltage multiplier in accordance with claim 1 wherein said diodes are silicon diodes.

9. A voltage multiplier comprising first and second end contacted layer capacitors, said capacitors being stacked upon each other, a plurality of substantially parallel slits extending alternately from opposite end faces of the stacked capacitor assembly to points intermediate of but not through the assembly, thereby electrically dividing the capacitor assembly into a number of individual capacitors which are serially connected by the remaining unslit portion of the metal coatings and which form the conductive layers thereof, an intermediate insulating layer separating the first and second end contacted capacitors, and a plurality of diodes arranged substantially parallel to each other and generally in a single plane which defines one side of the capacitor assembly, the diodes extending between the end contacts of the capacitor assembly and making electrical contact with the narrow edges of those end contacts.

10. A voltage multiplier in accordance with claim 9 wherein said first and second capacitors, being stacked to form an assembly, have opposite end faces contacted in common by the Schoop process, and the diodes are caused to span the capacitor assembly to make electrical contact between said opposite end faces.

11. A voltage multiplier in accordance with claim 1 wherein the two rows of serially connected capacitors are stacked one above the other and are separated by an intermediate insulating layer, said capacitors being end contacted by the schoop process, the intermediate insulating layer extending outwardly of the schoop layer, only one row of capacitors on each side thereof having free edge zones, diodes being arranged substantially parallel to said slots and making electrical contact with opposite end contact surfaces of said rows of capacitors.

12. A voltage multiplier in accordance with claim 11 wherein the portion of the intermediate insulating layer which extends outwardly of the schoop layer is free of schoop metal.

* * * * *